United States Patent [19]

Lewis

[11] Patent Number: 4,744,843
[45] Date of Patent: May 17, 1988

[54] RELEASE TREATMENT USING A NON-REINFORCING, NON-WOVEN FABRIC FOR CONVEYOR BELT CURING

[75] Inventor: Richard K. Lewis, Wadsworth, Ohio

[73] Assignee: The Goodyear Tire & Rubber Company, Akron, Ohio

[21] Appl. No.: 913,170

[22] Filed: Sep. 26, 1986

Related U.S. Application Data

[63] Continuation of Ser. No. 548,392, Nov. 3, 1983, abandoned.

[51] Int. Cl.$^4$ .............................................. B32B 31/20
[52] U.S. Cl. ................................... 156/87; 156/137; 156/289; 198/847; 264/258
[58] Field of Search ................. 156/289, 87, 137, 324, 156/323; 198/844, 846, 847; 264/169, 257

[56] References Cited

U.S. PATENT DOCUMENTS

| | | | |
|---|---|---|---|
| 1,952,468 | 3/1934 | Smith | 156/323 |
| 2,766,159 | 10/1956 | Adams, Jr. et al. | 198/844 |
| 2,894,855 | 7/1959 | Wilhelm et al. | 156/87 |
| 3,244,784 | 4/1966 | Boggs | 156/441 |
| 3,619,332 | 11/1971 | Bongers | 156/137 |
| 4,276,346 | 6/1981 | Bramwell | 264/257 |

*Primary Examiner*—Michael Ball
*Assistant Examiner*—David Herb
*Attorney, Agent, or Firm*—M. R. Dion, Sr.

[57] ABSTRACT

A method of molding and the article so molded wherein a non-woven sheet of continuous polymer filaments, preferably having their cross points bonded preferably without or with a filament adhesive, is used as the mold release agent and becomes part of the molded article.

4 Claims, 1 Drawing Sheet

RELEASE TREATMENT USING A NON-REINFORCING, NON-WOVEN FABRIC FOR CONVEYOR BELT CURING

This is a continuation of application Ser. No. 548,392, filed on Nov. 3, 1983, now abandoned.

TECHNICAL FIELD

This invention relates to a novel mold release in molding articles such as belts or related molded articles and to the resulting product.

PRIOR ART

It has been the customary practice to use or apply dust or liquid mold release agents to the surface of molds to prevent the molded article from sticking to the surface of the mold and to aid in stripping the article from the mold. These liquid mold releases are applied by scrubbing, brushing, spraying or similar techniques. This results in vapors being present in the atmosphere and also the mold release builds up on the mold surface and the molded article and has to be removed which is time consuming. Further, the vapors must be removed if they are harmful.

DISCLOSURE AND PRACTICE OF THE INVENTION

I have discovered that a polymeric monomer non-woven fabric made preferably directly from molten polymer as preferably continuous filaments that are entangled and may or may not be bonded at each crossover point can be used as a very satisfactory mold release in molding belts and related materials and the non-woven fabric becomes a part of the molded article. The resulting molded article has an improved appearance of the article due to the elimination of trapped air or gases and the elimination of mold release build-up with its effect on appearance of the molded article.

Figure 1:
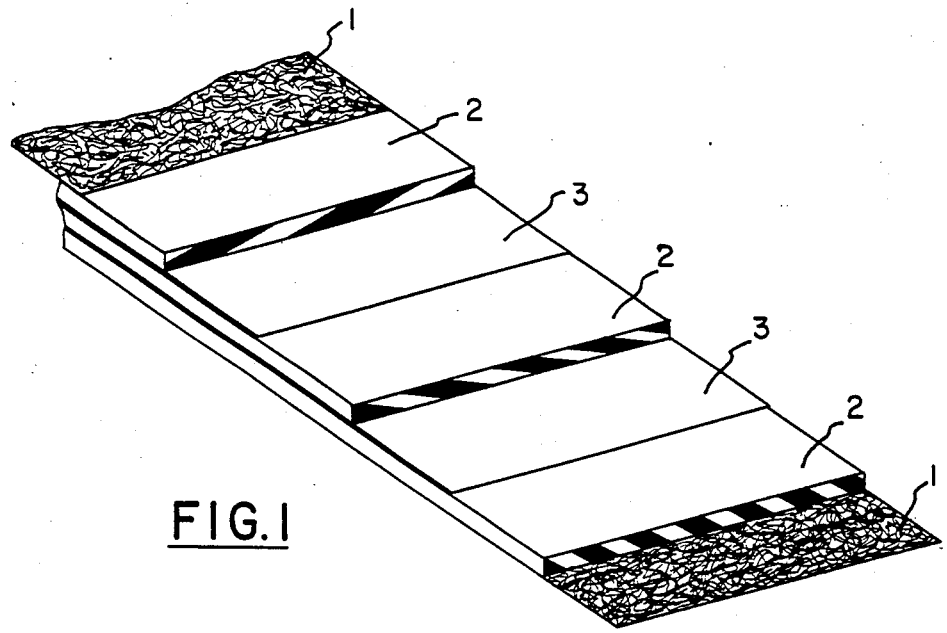
FIG. 1 shows a belt partially cut away produced in accordance with the present invention.
Figure 2:
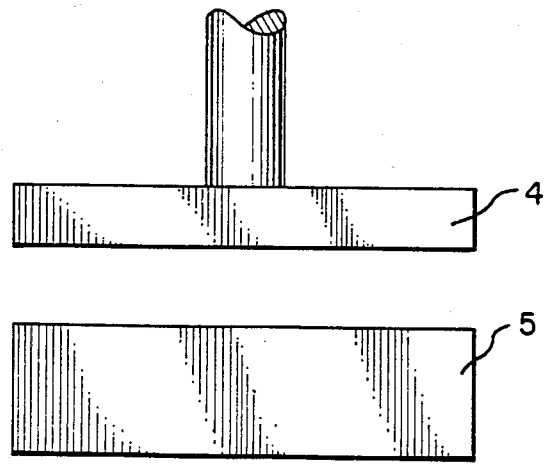
FIG. 2 shows the belt curing press usable in the formation of a belt.

The nature of this invention can be more easily and readily understood by reference to the drawings wherein FIG. 1 is a belt partially cut away to expose the details of its construction and FIG. 2 is a schematic view of a belt press opened and ready to receive release material and belt plies to be cured. The numeral 1 shows the face layer of the belt with the non-woven fabric of continuous polymer filaments pressed therein. The face layer 1 is bonded to a layer 2 of elastomer and the layer 2 is bonded to layer 3 of a reinforcing member such as a woven cloth or wires or longitudinal filaments or wires. Of course, those of ordinary skill in the belt art appreciate the layers of elastomer and layers of reinforcing material can be many more than the ones illustrated here.

Referring to FIG. 2 the belt press has its upper platen 4 raised from the lower platen 5 to provide a press ready to be loaded. A sheet of non-woven fabric having continuous or essentially continuous polymer filaments that are entangled or otherwise bonded at each cross-over point is spread on the lower platen. Then the belt components such as the layers shown in FIG. 1 are placed over the sheet on the platen and then a sheet is placed on the top of the plies. With the plies and release sheet or sheets in place, the platen 4 is lowered to place the belt under pressure, 0.10 to 10 MN/M$^2$ at a suitable cure temperature about 90 to about 165° C. for about 15 to 90 minutes depending on the cure recipe and thickness. Alternately, the fully plied up belt may be moved to the press and then be cured with the release sheet in position on at least one face.

The polymers useful for making the non-woven sheets, or more generally called light weight scrim, useful in this invention are well known and are available commercially. These polymers preferably are polyamides or polyesters that can be readily melted at temperatures above 200° to about 260° C. and can be extruded as continuous filaments. Also, the non-woven sheets formed from other polymer materials such as polypropylene or polyethylene may be used provided the molding temperature does not result in the filament melting or loosing its definition. A nylon 6, a non-woven fabric available under the Cerex brand is of spun bonded or entangled and continuous filaments that is non-raveling and of approximately equal strength in all directions is particularly suitable for use in this invention. These sheets usually are 0.125 centimeters or more thick and have a weight of 0.33 KGM/M$^2$ (0.3 oz./yd$^2$) or more. These sheets can be obtained in rolls approximately 3000 to 9000 meters in length and can be used to particular advantage in molding articles such as sheets or belts where a rotary cure is used.

I claim:

1. A method of manufacturing a reinforced rubber belt using a belt curing press having a lower platen and an upper platen, said upper and lower platens being moveable relative to each other, said method comprising:
    (a) superposing an outer layer of uncured rubber over a plurality of alternating layers of reinforcing members and uncured rubber to form an uncured belt precursor;
    (b) positioning a mold release layer on said outer layer of rubber of said belt precursor, said mold release layer being a non-reinforcing, non-woven fabric of entangled continuous filaments having a melt temperature above 200° C., said filaments being bonded at each crossover point and selected from the group consisting of polyesters and polyamides;
    (c) placing said belt precursor in said belt curing press between said upper platen and lower platen such that said mold release layer of said non-reinforcing, non-woven fabric is adjacent to one of said platens;
    (d) moving said upper platen and lower platen together to place said belt precursor overlaid by said mold release layer of non-reinforcing, non-woven fabric under sufficient pressure to make said non-woven fabric an integral part of said belt precursor;
    (e) heating said upper platen and lower platen to about 90° C. to about 165° C. for a time sufficient to fully cure said rubber layers of said belt precursor to form the reinforced rubber belt;
    (f) eliminating air trapped between said belt precursor and said upper and lower platens of said belt press by migration of said trapped air along said continuous filaments of said non-woven fabric mold release layer;
    (g) separating said upper platen and said lower platen to release the pressure on said reinforced rubber belt; and (h) removing said reinforced rubber belt from said belt curing press.

2. A method according to claim 1 further comprising the additional step after said positioning step (b) of laying a second mold release layer of non-reinforcing, non-woven fabric on an opposite side of said belt precursor from said mold release layer.

3. A method according to claim 1 wherein said reinforcing members of said superposing step (a) are selected from the group consisting of woven cloth, woven wire and longitudinal wire.

4. A method according to claim 1 wherein said filaments of said non-woven fabric are polyamides.

* * * * *